United States Patent [19]
Brisson

[11] Patent Number: 5,351,729
[45] Date of Patent: Oct. 4, 1994

[54] APPARATUS FOR LOG UNSCRAMBLING AND FOR FEEDING INDIVIDUAL LOGS TO PROCESSING SYSTEMS

[75] Inventor: Maurice Brisson, Laval, Canada

[73] Assignee: Les Ateliers Benoit Allard, Inc., Quebec, Canada

[21] Appl. No.: 92,383

[22] Filed: Jul. 14, 1993

[30] Foreign Application Priority Data

Jul. 24, 1992 [CA] Canada .................................. 2074645

[51] Int. Cl.$^5$ ........................ B27B 31/00; B65G 25/00
[52] U.S. Cl. .................................. 144/242 R; 83/276; 144/242 E; 144/242 H; 198/774.1
[58] Field of Search .................... 198/774.1; 83/276; 414/746.4; 144/242 R, 242 E, 242 H

[56] References Cited

U.S. PATENT DOCUMENTS

| | | |
|---|---|---|
| 2,327,734 | 6/1940 | Morgan . |
| 3,130,830 | 4/1964 | Allbeson ........................ 198/774.1 |
| 4,585,114 | 4/1986 | Liliano ........................... 198/774.1 |
| 5,086,912 | 2/1992 | Howden, Jr. . |
| 5,174,351 | 12/1992 | Lindenblatt et al. ........... 144/242 R |

Primary Examiner—W. Donald Bray
Attorney, Agent, or Firm—Iandiorio & Teska

[57] ABSTRACT

The disclosure describes an apparatus to move, individually and at a controlled rate, sawlogs and tree stems from a first multiple feeding station to a second station situated at a higher level than that of the first station; it comprises a frame, a set of fixed plates and a set of movable plates, both in parallel vertical planes. A system of levers is connected to the set of movable plates so as to serve as support and to supply it with a trajectory defining an arc of a circle. A rotary motor, a drive lever and a link cooperate to provide this trajectory with a sinusoidal-type acceleration.

5 Claims, 3 Drawing Sheets

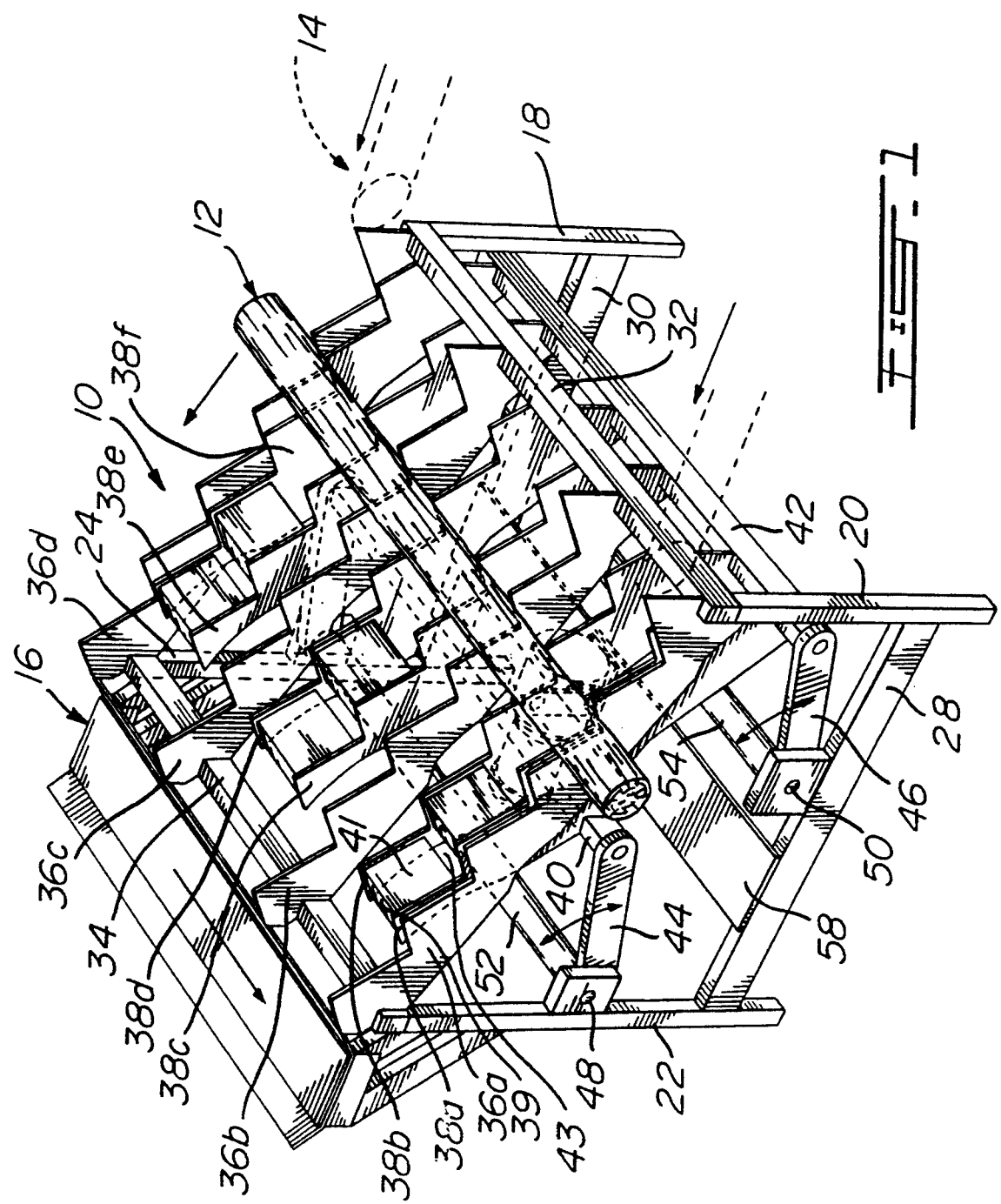

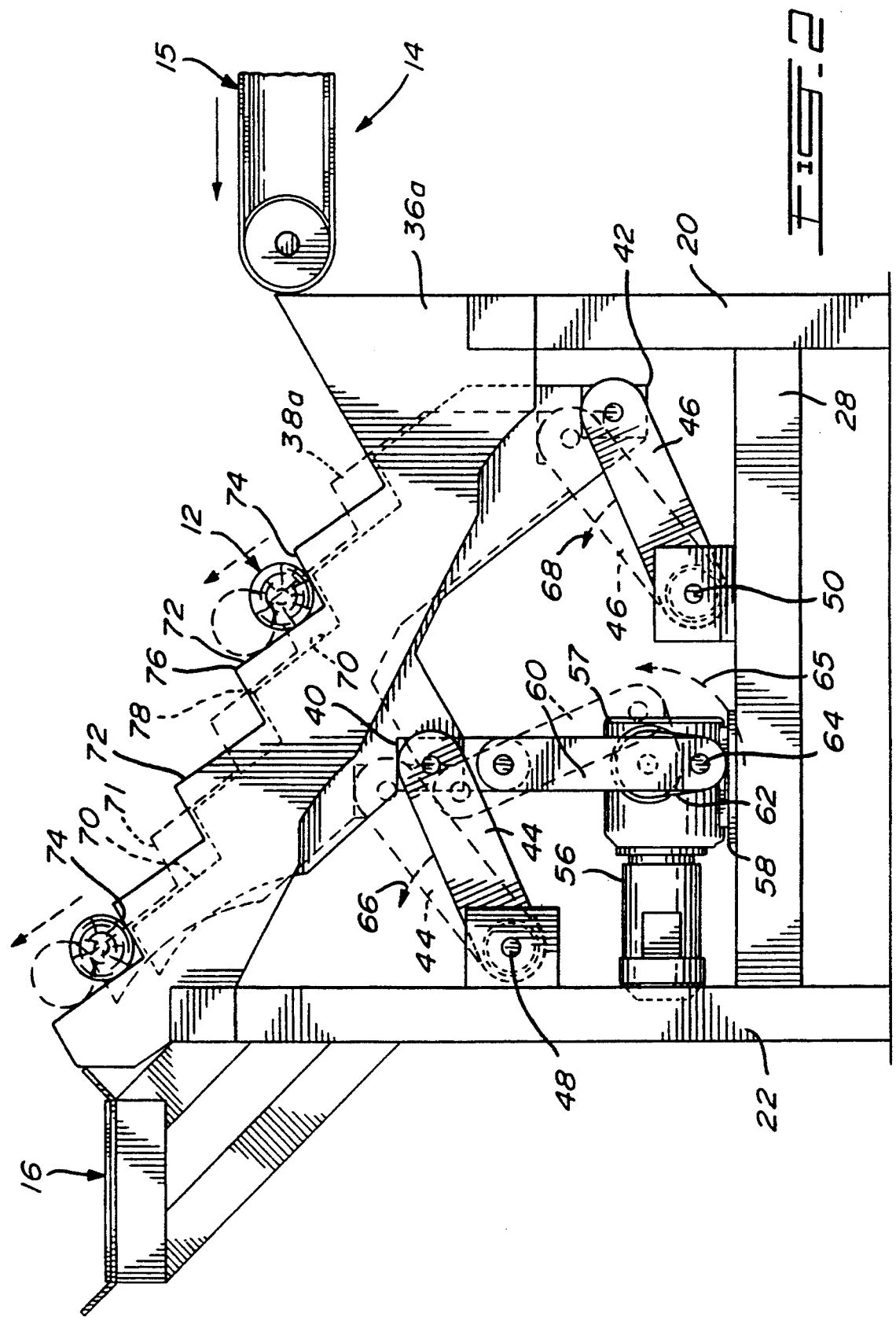

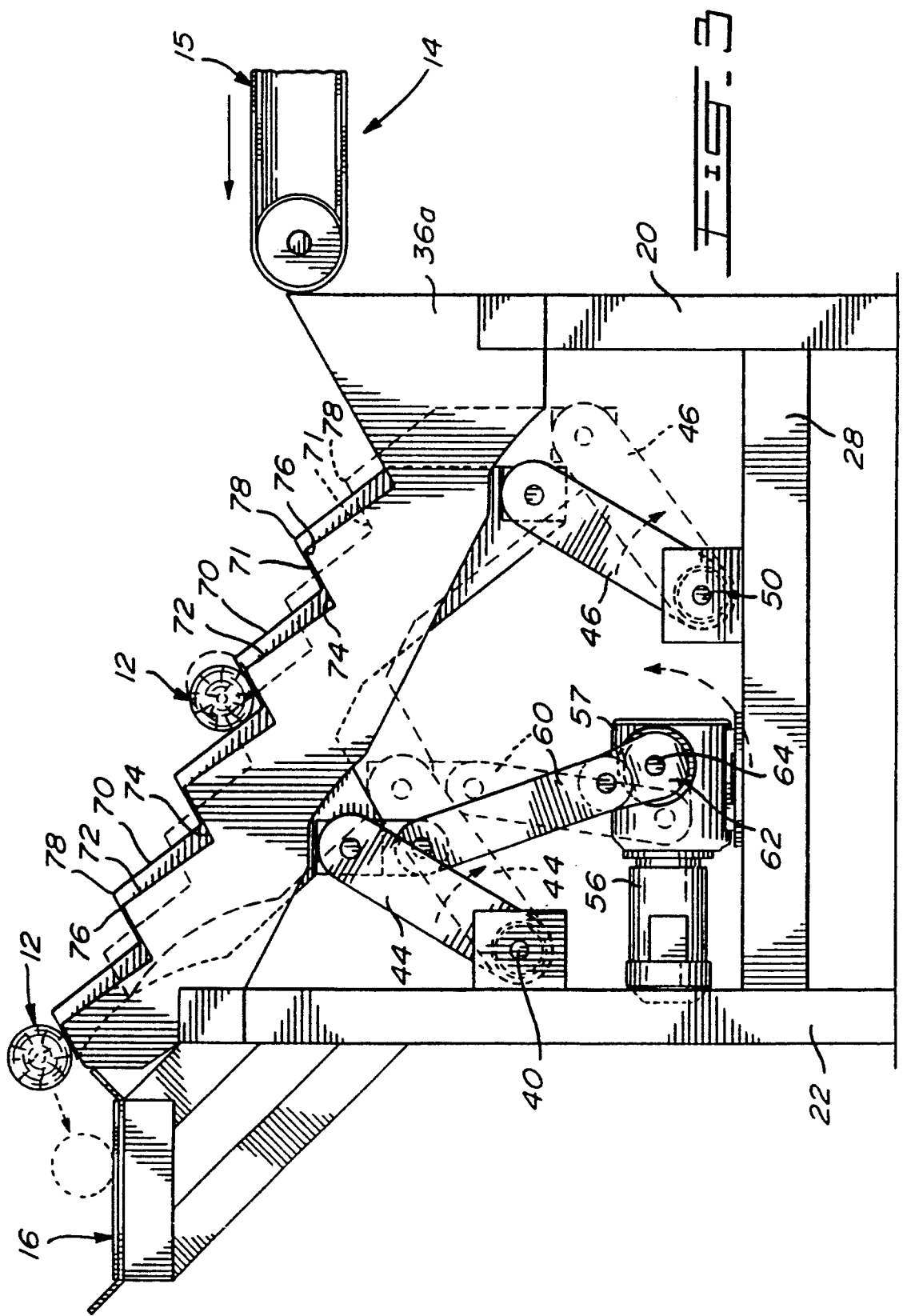

APPARATUS FOR LOG UNSCRAMBLING AND FOR FEEDING INDIVIDUAL LOGS TO PROCESSING SYSTEMS

FIELD OF THE INVENTION

The present invention relates to an apparatus for moving individually and at a controlled rate logs to be sawed or tree stems from a first multiple feeding station to a second receiving station that feeds a classification or transformation system.

Apparatuses of this type are known in forestry under the name "unscramblers" and are described, for example, in British patent 1,256,509, published Dec. 8, 1971 to Wellman-Cranes Ltd. and in Canadian patent 1,277,682, issued Dec. 11, 1990 to Interlog AB.

In the British patent, there is described a system in which elements of cylindrical shape are moved from a first station to a second station, but in a same horizontal plane. The apparatus is composed of a set of fixed plates and a set of movable plates, both sets cooperating to displace the elements from the first station to the second station.

In the Canadian patent, there is described an apparatus of the same type, but wherein an inclination exists between the feeding station and the receiving station and wherein the movement of the movable plates is rectilinear.

These two systems utilize, for the displacement of the transported elements, a movement of the set of movable plates obtained with the aid of hydraulic jacks. In the cases of displacement of logs having irregular shapes, the dynamic reactions, due to shocks created by the reversal travel of hydraulic jacks used in systems of this type, result in certain logs being unstable at their equilibrium point and produce a negative effect on the efficiency of the apparatus, especially at high operating speeds.

An object of the present invention is to overcome the problems associated with such apparatuses. This object is achieved by applying to the movable plates a trajectory describing an arc of circle and subjected to a sinusoidal-type acceleration. There results a full control of the trajectory of the acceleration and of the speed of all travelling points of the movable plates which are responsible for the displacement and the separation of the logs, insuring at the same time an operational parallelism with respect to the fixed plates. The mechanical concept of the present invention equally enables the variation and the precise adjustment of the rate of displacement of the plates, thereby ensuring a totally synchronized feed with the manufacturing process and reducing the amount of free space between the displaced elements.

An additional advantage consists in making possible higher displacement rates thereby increasing the feeding capacity of the process due to a gradual acceleration thereby avoiding the shock of sudden path reversal.

The present invention therefore refers to an apparatus used in moving sawlogs or tree stems from a first multiple feeding station to a second receiving station which is elevated with respect to the first station, comprising:

a frame;

a set of fixed plates mounted on the frame, the plates being parallel to one another and inclined upwards from the first station to the second station; each of the plates having, along its upper edge, a shape adapted to receive logs or stems;

a set of movable plates spaced parallel to the first set of fixed plates, each of the movable plates having, along its upper edge, a shape adapted for the displacement of logs and stems;

movable support means connecting the set of movable plates to the frame and being adapted, when moving, to provide the set of movable plates with a trajectory corresponding to an arc of circle, and driving means, mounted on the frame and associated with the support means, adapted to provide the trajectory of the movable plates with a sinusoidal acceleration.

According to a preferred form of the invention, the support means consist of levers having one extremity connected to the set of movable plates and an opposite extremity pivoted to the frame.

According to a preferred form, the driving means comprise a rotary motor, a drive lever and rod means connected to the set of movable plates.

The present system allows to operate with inclination angles greater than those of present systems, i.e., 35° or more, under certain conditions of log diameter which can satisfy, in most cases, the operational requirements in concerned industries.

Furthermore, an improvement in the alignment in parallelism of the transported elements is obtained by the higher inclination angle of the components facing the initial feeding by mixed pilings.

Furthermore, this higher inclination angle and the application of a gradual acceleration in all of the displacement faces of the movable plates allow a more constant separation of the transported elements, said gradual acceleration by eliminating the shocks due to the travel reversal of the hydraulic jacks used as driving means in known systems, such as described above in the British patent and the Canadian patent.

The present invention further provides safety in the mechanical operation by the elimination of lateral guides and rolling paths of the movable plates which are vulnerable to the falling of debris, such as bark, branches, fragments, etc.

Other features and advantages of the invention will be deduced from the description that follows with respect to the annexed drawings which are given as non-limiting example.

IN THE DRAWINGS

FIG. 1 is a perspective view of an apparatus according to the present invention;

FIG. 2 is an elevational view illustrating the set of movable plates in a first position of log displacement; and FIG. 3 is elevational view illustrating the set of movable plates in a second position.

Referring to FIG. 1, the apparatus, generally designated 10, serves to move logs 12 or tree stems from a first feeding station 14 to a second receiving station 16 which feeds a classification or transformation system. First station 14, illustrated in FIG. 2 by a conveyor 15, is at a level lower than that of the receiving station 16.

The apparatus comprises a frame composed of vertical supports 18, 20, 22 and 24 interconnected by means of lateral lower members 28 and 30 and upper traverses 32 and 34.

A set of fixed plates 36a, 36b, 36c and 36d, parallel to one another, each have their opposite extremity fixed to the traverse beams 32 and 34. The upper profile of these plates defines an inclination angle from the first station to the discharge station of the logs and also defines retention stations for the logs transported by the movable plates.

Disposed between the fixed plates, a set of movable plates composed of lateral plates 38a and 38b, 38c and 38d, 38e and 38f is provided in a parallel arrangement. The upper part of each of these plates defines an inclination angle and a shape in the form of teeth, similar to those of the fixed plates; but, they conform to their function of displacing and separating logs or stems. Each of the lateral plates is connected, along its upper contour, by a series of arrangement of two plane surfaces (39 and 41, for plates 38a and 38b) which include an opening 43 at the base of each profile to permit the passage of debris. In order to avoid confusion of the various components of the apparatus, only a few of these intermediate plane surfaces (39 and 41) have been illustrated in FIG. 1. The lower parts of the plates are fixed to two transverse members 40, 42, each having its opposite extremities pivotally mounted to levers 44, 46. The opposite extremity of each of the levers is pivotally mounted at 48 and 50 to the vertical supports 22 and 24 and to members 28 and 30. Two tubular beams 52 and 54 fixedly connect the opposite levers 44, 46 and include at their opposite extremities the pivotal axes 48 and 50.

Referring to FIG. 2, an assembly comprising a motor 56 and a speed reducer 57 of the gear type is fixed to a lower traverse member 58 of the frame. A rod 60 is connected to the reducer 57 by means of a drive lever 62 having one extremity fixed to the output shaft of the reducer and the opposite extremity to the rod 60 at pivot axis 64. The driving may be accomplished hydraulically, provided however, that the movement of the output shaft is rotary.

A description of the operating system will now be given with reference to FIGS. 2 and 3. At the beginning of each operating cycle, in the lower part of the system, the lever 62 is displaced (see arrow 65) out of its lower point as indicated by dotted lines in FIG. 2 and, through link 60, the lever gradually accelerates the mass of the movable plates in the ascending direction of the arc of a circle, as illustrated by arrows 66 and 68, and defined by the displacement of the pivots connecting the carrying levers 44 and 46 and the transverse members 40 and 42. This displacement brings faces 71 of the movable plates 38 in contact with the logs or stems 12, which are stationary between the supporting faces 72 and 74 of the fixed plates 36 at each of the ascending stages, starting from the receiving station, thereby moving the logs towards the upper part of face 72. The displacement continues (see FIG. 3) until face 71 bypasses face 74, at which time the logs retained in various ascending stages by faces 70 and 71 are placed near face 74, to eventually rest in the angle formed by faces 72 and 74 prior to the complete return of the movable plates to their lower position.

The separation process of the logs occurs twice during a complete cycle:
a) in the ascending movement, when the summits 76 and 78 are adjacent to one another in the uppermost part of the travel, and
b) in cases where two logs, or more, reach a reject station, the displacement along an arc of circle, which is repeated on the return, causes the excess logs to be raised beyond faces 74 and to drop rearwardly above point 76, to be again placed in the preceding ascending stage. The analysis of the passage of the logs from the initial receiving level until the following retention level applies to all subsequent stages until the final discharging of the logs at the upper part 16 of the apparatus.

Thus, the support and drive means of the movable plates, in addition to permit an ascending angle equal or above 35°, provide also a higher flow of elements at a higher rate and operational speed, without mechanical inconveniences. Therefore, the concept of mounting the movable plates on oscillating levers ensures a positive control of the trajectory of these plates for every ascending angle and operational speed. Furthermore, the drive means provides a gradual acceleration in both directions of movement, for all operational speeds, thereby avoiding impact on the logs and the dynamic reactions which result therefrom in systems utilizing hydraulic jacks.

Although the invention has been described with respect to a preferred mode, it is evident that it may be modified and refined in various ways. It is therefore wished that the scope of protection to be given to the present invention should only be limited by the scope of the accompanying claims.

What is claimed is:

1. An apparatus for moving sawlogs or tree stems from a first multiple feeding station to a second receiving station which is elevated with respect to a second receiving station which is elevated with respect to the first station, comprising:
   a frame;
   a set of fixed plates mounted on said frame, said plates being parallel to one another and inclined upwards from said first station to said second station; each of said plates having along its upper edge, a shape adapted to receive logs or stems;
   a set of movable plates spaced parallel to said first set of fixed plates, each of said movable plates having, along its upper edge, a shape adapted for the displacement of logs and stems each of said movable plates movable along its longitudinal plane;
   movable support means connecting the set of movable plates to said frame and providing the set of movable plates with a reciprocating trajectory corresponding to an arc of circle, and
   driving means, mounted on said frame and associated with said support means, imparting a sinusoidal acceleration to said movable plates along said trajectory for moving saw logs or three stems upwardly from the first multiple feeding station to the second receiving station.

2. An apparatus as defined in claim 1, wherein said support means consist of levers having one end pivotally connected to said sets of movable plates and an opposite end rigidly connected to a tubular beam pivotally mounted to said frame.

3. An apparatus as defined in claim 2, wherein said support means further consist of a pair of transverse beams fixed to a lower part of each of said movable plates and connected pivotally at said one extremity of said levers.

4. An apparatus as defined in claim 3, wherein said driving means include a rotary motor, a drive lever associated with said motor, link means connected to said drive lever; said link means providing a reciprocating motion along the arc of a circle to said set of movable plates.

5. An apparatus as defined in claim 1, wherein said set of fixed plates have an inclination angle of about 35°.

* * * * *